United States Patent Office 2,807,324
Patented Sept. 24, 1957

2,807,324
METHOD OF INCREASING OIL RECOVERY

Jack A. King and Wayne S. Fallgatter, Tulsa, Okla., assignors to Cities Service Research and Development Company, New York, N. Y., a corporation of New Jersey No Drawing. Application January 24, 1956,
Serial No. 561,153

14 Claims. (Cl. 166—29)

This invention relates to a method for treating subterranean strata, and more particularly concerns an improved method for adjusting and controlling the permeability of oil and gas-bearing formations to increase flow and recovery of oil and gas therefrom.

In conventional oil and gas production operations, after a well or bore hole has pierced oil-bearing strata, naturally existing driving forces move the oil from the strata into the production well. This flow of oil is often accompanied by an undesirable flow of water, or brine, which burdens the recovery equipment and dilutes the product.

Several methods have been attempted with varying degrees of success to limit this undesirable flow. While the problem of controlling water flow is very important when the wells are operating under natural driving pressures, the problem of preventing water flow becomes acute when secondary recovery methods are being utilized. In strata where natural drives have become exhausted or depleted, pressures can be applied to the strata by various means so that additional oil, by-passed by the natural driving fluids or too firmly held by the strata to be removed by the reduced natural pressures, can be removed. These supplementary driving forces are generally referred to as secondary and tertiary recovery operations.

Several techniques have been developed, particularly in connection with secondary recovery methods, for controlling this undesirable flow. In carrying out a secondary recovery program, several pressure or flood holes are drilled at spaced intervals in a fixed pattern around a production well. If the existing production well pattern permits, additional flood wells may not be required. After a flooding well pattern has been obtained, water or brine under pressure is injected into these wells and forced to move out into the strata away from the flood well in the direction of the producing well. As the pressurized flooding medium moves outwardly from the injection well, a band of oil builds up before it and moves toward the production well. If the oil-bearing strata were of substantially constant permeability throughout, it would be theoretically possible to recover substantially all of the oil present in the strata. However, due to the characteristics and composition of the formations in which the oil is present, this is not possible since the presence of varying rock composition, innumerable fissures and other interstices in the formation has a tendency to permit channeling of the drive fluid and by-passing of oil deposits. This condition is particularly prevalent when the production well was initially brought in by means of high-pressure fracturing techniques. The presence of the fissures or cracks occurring naturally or resulting from fracture permits the flood water to by-pass oil-bearing strata and move directly into the producing well.

To overcome this type of flow, several plugging methods have been proposed. For example, U. S. 2,238,930 describes a process for treating a formation in which a solution of a metal salt capable of forming an insoluble precipitate is introduced into the formation. When the solution is brought into contact with alkali materials, either introduced into the well or present in the earth formation, a precipitate forms which plugs the pores of the strata. In our copending application Serial No. 466,006, now Patent No. 2,747,670, we have described a process for the controlled and selective adjustment of permeability, utilizing spaced reactant solutions which on contact in the strata produce a precipitate which will effect a selective permeability adjustment of the strata. According to the method described therein, control of the area, amount and position of the precipitate or plug is accomplished by utilizing a measured amount of spacing liquid. The reactants therein described are of a type which provide on reaction a single precipitate which while generally satisfactory has some limitations, primarily in volume, strength, tenacity, and solubility.

We have now discovered that while such a precipitate provides controlled adjustment of permeability under most circumstances, the utilization of spaced, oil insoluble reactant solutions which react in a double decomposition reaction, that is, are mutually precipitable, are far more effective and greatly superior in their plugging effect. The presence of a double precipitate of the type hereinafter defined is capable of permitting higher pressures to be applied to the flooding fluid, thereby increasing substantially the amount of oil recovered. We have found that a single precipitate such as ferric hydroxide obtainable by reacting a ferric chloride solution with alkali does not under all circumstances provide the desired plug volume or have sufficient strength and tenacity to allow extremely high pressures to be applied to the flooding medium. Moreover, experience has shown that the single precipitate type of plug may be partially removed or diluted by the presence of acidic or basic brines, or even by the flooding medium itself.

This invention contemplates, therefore, the introduction into the formation of a solution of a reagent which on contact with a second reactant solution in the strata will result in a double decomposition reaction providing a double precipitate. The area in which the reaction takes place is controlled by means of a measured volume of spacer solution placed between the reactant solutions during their introduction into the well. The presence of the specific amount of the inert spacing medium prevents the undesirable and premature precipitation of the reactants and insures deposit of the plug or precipitate in the area and in the amount desired. Utilizing the spacing medium in measured quantities, as hereinafter described, provides the formation of a precipitate at a distance from the well bore and in an amount which will effect maximum recovery of oil.

We have further found that under certain conditions the introduction of granular materials, particularly those of a hydratable type, either in the reactant solutions or in the spacing medium or both, will add to the effectiveness of the plug. The addition of such materials provides increased plug volume and makes possible permeability adjustment and control in formations that have large fissures such as are found in strata which has been subjected to fracture technique.

According to the method of our invention, an oil insoluble aqueous solution of ferrous sulfate is brought into contact with an oil insoluble aqueous solution of an alkali metal silicate in the manner described below to form a compound or double precipitate of ferrous hydroxide and silica gel.

$$FeSO_4 + MSiO_3 + H_2O \rightarrow Fe(OH)_2 + SiO_2 + MSO_4$$

Where M is a mono valent metal selected from the group comprising sodium and potassium.

It is recognized that plugging of strata has been attempted with silica gel compositions formed in situ by acidization of the strata. It is also generally known that gels have been prepared and introduced into the strata along with stabilizing agents to provide controlled precipitation. However, no method is known in which an increase in the plugging effect is accomplished by means of a controlled double decomposition reaction that results in a double precipitate of gelatinous ferrous hydroxide precipitate and silica gel. The specific area of reaction is, of course, obtained by the careful control of the amount of spacing medium used between the ferrous sulfate and metal silicate solutions.

In carrying out treatment of strata to provide controlled reduction of permeability, according to the method of our invention, an aqueous solution of ferrous sulfate is prepared, generally in a strength of from about 1 percent to about 20 weight percent. The solution is introduced into the well tubing or drill stem and allowed to enter the formation either by natural flow or by the introduction behind it of a pressurized quantity of driving fluid such as water, brine, or the like. Since the ferrous sulfate solution is substantially inert to the well tubing, no control of corrosion is necessary as is required when ferric iron salt solutions are used. Following the introduction of the aqueous ferrous sulfate solution, a measured quantity of an inert spacing fluid is introduced into the formation. When substantially large areas of a particular formation are undergoing treatment and considerable quantities of reactant solutions are being used, hundreds of gallons of spacing medium may be required. If desired, the spacing medium may be utilized as a driving force for the first reactant solution.

Following the introduction of the inert spacing medium, the second reactant solution is introduced into the formation. This second solution comprises an aqueous silicate solution. The solution will have a strength from about 1 percent to about 38 weight percent. The volume of silicate solution used will be substantially the same as the volume of the ferrous sulfate initially introduced provided, of course, that the solutions are of approximate equal strength. Silicate solution is introduced into the well and passed into the strata in a manner similar to that in which the ferrous sulfate is introduced into the strata. Normally the silicate solution will be followed by a pressurizing fluid to insure its movement and penetration deeply into the strata. When the reactant solutions are used in separate portions or slugs, the silicate solution will be followed by a second quantity of spacing medium which in turn can be followed by a further quantity of ferrous sulfate.

In the foregoing discussion, the ferrous sulfate solution has generally been referred to as the initial treating solution or the solution which is first introduced into the well. It is to be understood, however, that the silicate solution may be introduced into the strata first, if desired, and thereafter followed by the spacing medium and the ferrous sulfate solutions. Introduction of the reactant solutions in this order provides equally effective precipitation.

It is, of course, understood that the treating solutions of ferrous sulfate and the alkali metal silicate can be introduced as one treatment. However, we have found it preferable to introduce smaller portions of the reactants together with comparatively equal proportionate amounts of the spacing medium. Introduction of the reactant solutions in such a manner permits a gradual and uniform build-up of precipitate in the pores of the strata being treated.

As previously mentioned, it is an important feature of this invention to provide the desired double decomposition reaction and the double precipitate resulting therefrom in an amount and in the specific area desired. Since these reactant solutions tend to precipitate on the least contact, the amount of inert spacing fluid introduced between them becomes an important factor. Control of the precipitate formation as to area, concentration and position is a function of the distance by which the solutions are separated as they move through the strata radiating outwardly in ever expanding circles from the input or injection well. In most flooding operations, past experience with the field and specific information obtained therefrom such as reservoir rock data, thickness of the production zone, oil and water saturation data, percent porosity of the strata and permeability measurements of cores, form a basis upon which the degree of permeability adjustment and area of adjustment can be determined. The volume of water flowing into the production well, either by reason of the flooding operation or if the process is being applied in limiting water flow under natural drive, will be an indication of the degree of plugging or permeability adjustment required.

With this information, an estimate of the amount of spacing liquid required to permit contact of the reactant solutions at the desired distance from the injection well can be made. According to our method, however, a more accurate positioning of precipitate is desired and can be obtained by the equation, $v = 2\pi\ rwhps$. This equation provides the specific volume of spacing medium required to place the plug at the desired position. In the equation $1 = 2\pi\ rwhps$, $r$=distance from the injection well at which precipitation is to begin; $w$=width of spacer liquid band desired at distance $r$ from injection well; $h$=thickness of zone being treated; $p$=porosity; and $s$=average water saturation up to the point where reaction is to start.

In order to more clearly describe the utility of the foregoing equation in determining the volume of spacing liquid required to adjust permeability in a specific area, we will assume the treatment of a sandstone formation, 12 feet thick, having a porosity of 18%, with the pore structure containing 28% by volume of water and 72% by volume of oil. Permeability adjustment is desired in a zone extending from a circle 10 feet from the well bore to a circle 50 feet from the well bore.

While the input well to be treated is full of injection fluid, that is, the driving medium, a few barrels of fresh water are injected. This solution will prevent mixing of the chemical treating solutions with the driving medium, and thereby avoid premature precipitation. The quantity of fresh water can be varied, depending on the tubing diameter and the depth of the well. Following the water, 14 barrels of 13.0% Fe$_2$SO$_4$ are injected into the well, followed by 3.4 barrels of fresh water as the spacing liquid. The quantity of spacer liquid is determined as follows: $V = 2\pi\ rwhps$, where $r$, distance from the well bore at which precipitation is to begin, $=10$ feet; $w$, width of spacer liquid liquid band desired at $r$, $=0.5$ foot; $h$, thickness of zone being treated, $=12$ feet; $p$, porosity, $=18\%$; $s$, average water saturation (or percent pore volume occupied by water), $=28\%$; or $$V = 2 \times 3.14 \times 10 \times 0.5 \times 12 \times .18 \times .28 =$$
19 cubic feet or 3.4 bbl.

After addition of the spacing liquid, 14 barrels of 17.5% sodium silicate are added to the input well. The quantities of silicate and ferrous sulfate used are based on the finding that a formation of the assigned characteristics requires approximately 5.14 pounds of chemicals per 100 cubic feet of rock treated. In the foregoing, the total volume of the formation is 90,500 cubic feet. Hence, 1330 pounds of Fe$_2$SO$_4$ 7H$_2$O and 3,320 pounds of 37% sodium silicate are necessary to produce the desired reaction.

The effectiveness of permeability adjustment carried out according to the method of our invention will be readily apparent from the specific examples which follow:

*Example 1*

In carrying out the selective adjustment of permeability according to the proposed method, a series of synthetic sandstone blocks were prepared by mixing commercial Hysol (trade name for a plastic of unknown composition manufactured by Houghton Laboratories, Olean, New York) with sand in the proportion of 4 to 15 parts Hysol with 100 parts of sand by weight. From 2 to 8 parts of isopropyl alcohol were added to facilitate mixing. The sand is formed into the desired form and thickness, usually for purposes of our experiments a block 12" x 12" x 1", and allowed to set. The block is baked in an oven of 80° C. for several hours to remove the alcohol and then coated with a layer of Hysol. Injection and production wells ¼" in diameter are drilled at diagonal corners of the block. This provides a flow path of about 15" and represents one quadrangle of a five-spot flooding system.

A block prepared in the manner and size described above having a porosity of 8.6% and a permeability to water of 127 millidarcies was treated according to the method of our invention as follows: Into the injection well 5 ml. of 17.5% aqueous sodium silicate were introduced, followed by 20 ml. of water spacer, which was followed by 5 ml. of 13% aqueous ferrous sulfate. After flow rates had become stabilized (about 200 ml. of water injected), the permeability to water was 10 millidarcies. A second treatment of the same core with the same reactant solution quantities in like manner further reduced the permeability to 1 millidarcy.

*Example II*

To determine the ability of the process of this invention to adjust selectively strata having varied permeability, a stratified block was consolidated with plastic in the manner described in Example I, utilizing a ¾" layer of 30–50 mesh sand and a ¾" layer of 70–40 mesh sand. This provided one zone of about 1.5 darcies permeability and another zone of about 15 darcies with vertical flow possible between the two layers. Air permeability on the finished block was 11 darcies with the block having a porosity of 24.8%. The block was saturated with kerosene (726 ml.). Water flooding was initiated and continued to the point where very little oil was being produced. To increase oil flow from the block under water flood, four treatments were carried out, each consisting of introducing a solution of 5 ml. of 17.5% sodium silicate into the block, followed by a water spacer. The spacing medium was then followed by the introduction of 5 ml. of 13.0% ferrous sulfate solution. The following table sets forth the results of these treatments:

| Treatment | Ml. H₂O Spacer | Point of introduction (cumulative ml. injected fluid) | Percent increase in oil recovery |
|---|---|---|---|
| 1 | 20 | 750 | 27 |
| 2 | 20 | 2,350 | 7 |
| 3 | 40 | 3,100 | 32 |
| 4 | 60 | 4,100 | 6 |

It will be evident from the foregoing table that substantial increases in oil production were obtained by the treatments. It is noted that the second treatment resulted in a smaller increase in oil produced than treatment number one. Since the spacer volume in the second treatment was the same as that in the first, precipitation presumably occurred in the same general area. In the third treatment, where the spacer volume was increased to 40 ml., a considerable increase in oil production is noted, indicating deeper deposition of the plug in the block. The fourth treatment, wherein a 60 ml. spacer was used, produced an additional quantity of oil, though somewhat less than the first and third treatments. Over-all increase in produced oil by the four treatments was 72%.

The selective adjustment or plugging of strata is often more difficult in those areas where production was initially enhanced by means of a fracturing treatment. The utilization of pressurized fracture treating creates comparatively wide cracks or fissures in the formation as distinguished from the somewhat smaller naturally occurring channels present in strata prior to fracture.

When normal plugging treatment is carried out in fractured strata, it is customary to cement squeeze the well. This is accomplished by pumping a cement slurry into the well at high pressure. The treatment is intended to seal off the fracture completely and to force injected water into new oil bearing zones. There are many disadvantages, however, to such a technique including the cost of the cement, the equipment required to carry it out, and the problems faced when cement removal is required. Treatment of fractured formations according to the method of our invention provides increased oil recovery whether or not a fracture is present. Moreover, the plugging method of our invention can be utilized without the employment of expensive input profile surveys before the treatment to see where the fluid is being lost, and, whether the loss is due to fractures or merely to highly permeable areas in the strata. It will be obvious that the cement squeeze technique cannot be utilized in highly permeable sections which have not been fractured because penetration of the sand by the cement would be substantially impossible. While some correction of permeability can be obtained by conventional methods of plugging in the presence of such fractures, such methods have not generally proved successful including the method described in our copending application Serial Number 466,006, filed November 1, 1954, mentioned above. According to the method of our invention, strata containing fractures can be successfully plugged by utilizing the double decomposition reaction of aqueous ferrous sulfate oil insoluble solution and aqueous sodium silicate to provide substantial reduction of the fracture. This plugging results in considerable increase in oil recovery. Example III which follows demonstrates the effectiveness of our process in selectively adjusting permeability in fractured strata.

*Example III*

A one inch plastic consolidated sandstone block of about 1.5 darcies permeability was prepared according to the method described in Example I. On this sandstone block a one inch thick block of Lucite plastic was placed and sealed at the edges so that a crevice or fracture visible through the Lucite block remained between the two blocks. The block was evacuated and completely saturated with kerosene (558 ml. required). Normal water flooding was then carried out. Water broke through the crevice between the blocks very quickly after initial flooding began, with the oil production curve leveling out at about 11% of the oil produced. To overcome this flow to the fracture, five plugging treatments were carried out, each treatment consisting of 2 ml. of 17.5% by weight sodium silicate solution, a water spacer (in the amount recorded in the following table), and 2 ml. of a 13% by weight ferrous sulfate solution. The following table records the results of these treatments:

| Treatment | Ml. H₂O Spacer | Point of introduction (cumulative ml. injected fluid) | Percent increase in oil production |
|---|---|---|---|
| 1 | 10 | 523 | 195 |
| 2 | 10 | 1,140 | 63 |
| 3, 4, 5 | 5, 5, 5 | 1,775 | 12 |
| | | | 270 |

It will be noted from the table above that the first treatment resulted in a marked increase in oil production with subsequent treatments providing substantial increases, though not of the degree that treatment No. 1 provided. The over-all increase in oil production due to plugging of the fracture was 270% based on the expected yield from normal water flooding. This result is due to the volume and tenacity of the double decomposition plug provided by our method.

As previously indicated, we have found that an improved result can be obtained in plugging fractured formations or formations containing highly permeable strata according to the method of our invention by incorporating granular material in the treating solutions or by first introducing such material into the strata prior to treatment. The use of a suspended granular material along with the reactant solutions or the inert spacing liquid or both adds body to the plug or precipitate and enables it to remain firm in the wider crevices. We have found, for example, that the introduction of sand, hydratable clay, powdered limestone, fibrous material, and other solids imparts considerable strength to the holding characteristics of the plug. This will be evident from the examples which follow:

*Example IV*

A ¼" diameter steel pipe one foot long was horizontally mounted and suitable connections provided at one end to allow introduction of fluids. The opposite end of the pipe remained open. Plugging chemicals were introduced in the following manner: 2 ml. 17.5% $Na_2SiO_3$, 4 ml. $H_2O$, 2 ml. $FeSO_4$ and 4 ml. $H_2O$. This treatment was repeated four times with the plug being expelled at a pressure of 14 p. s. i.

In a second series of treatments carried out on the same pipe utilizing the same material in similar amounts and proceeding according to the same technique, a slurry of 50–200 mesh sand in water was flowed through the tube in a manner that permitted the sand to settle out in the tube. With the sand present, pressures up to 200 p. s. i. were obtained after four similar treatments, without dislodgement of the plug.

*Example V*

A ¼" diameter steel pipe one foot long was mounted in a horizontal position and provided with suitable connections to allow introduction of pressurized fluid to one end; the other end remained open. Plugging chemicals were introduced in the following manner: 2 ml. 17.5% $Na_2SiO_3$, 4 ml. $H_2O$, 2 ml. $FeSO_4$ and 4 ml. $H_2O$. This treatment was repeated four times, with the plug being expelled from the pipe at a pressure of about 14 p. s. i.

To increase the holding power of the $Fe(OH)_2$—$SiO_2$ plug, powdered calcium carbonate was suspended in the sodium silicate solution in the proportion of 15 grams of the solid to 50 ml. of 38% sodium silicate solution. The chemicals were introduced in the following manner: 1 ml. 38% $Na_2SiO_3$ (plus $CaCO_3$), 2 ml. $H_2O$, 2 ml. 13% $FeSO_4$. After four treatments, a pressure of 100 p. s. i. could be applied to the pipe with the plug remaining intact.

The amount of granular material added to the reactant solution or to the spacing medium will vary depending on the nature of the material. It is necessary that the solutions be pumpable and, therefore, a slurry type solution will generally be used. It will be necessary to avoid a premature deposit of the granular material so that a build up will not occur at the well bore which will prevent penetration of the reactant solutions. This effect can be avoided by using the granular material in dilute solutions which are moved into the formation under rather high pressure conditions and at a comparatively high rate.

When the granular material added to the treating solutions is a hydratable clay such as montmorillonite or bentonite a two-fold effect is accomplished. The clay particle itself adds to the precipitate volume, and moreover swells on contact with well brine.

In carrying out a treatment of a formation according to our method it is not our intent to allow the precipitate to block off completely all fluid flow. It is, of course, obvious that as precipitate or plug builds up in a particular channel less fluids will be admitted thereto. This has the desirable effect of forcing the reactant solutions into other channels where precipitation will then occur, with concurrent permeability adjustment. As precipitation occurs and permeability is affected, the degree of adjustment will be reflected at the surface by an increase in surface injection pressure. The pressure record obtained provides a measure of the permeability change. This is determinable according to Darcy's law which states that the pressure is inversely proportional to the permeability of the formation if other factors such as flow rate, temperature, fluid viscosity and reservoir dimensions remain constant.

The selectivity of our process is obtained by several factors among which are the adsorption characteristics of the reactants, the viscosity of the solutions and deposition of precipitate primarily in water channels rather than oil channels.

The adsorption characteristics are important since the first reactant solution on passage through a particular channel will leave part of its solution on the rock surface to be reacted with the second reactant solution as it passes through the same channel. It may be desirable and is within the scope of our inveniton to add to the reactant solutions a small amount of an agent which will increase the adsorption characteristics. It is also contemplated that a small amount of a surface active agent be added to assist the flow of reactant solutions through the formation.

Since the viscosity of the solution has considerable influence on the selectivity of the process some control of viscosity may be desirable. We have found for example that solutions of increased viscosity will preferentially travel in the larger channels. In treating fractured formations, therefore, we prefer to use reactant solution of higher viscosity. The higher viscosity solutions in addition have a tendency to desorb more slowly from the channel wall, so that a following reactant solution will overtake the first solution more quickly and deposit larger amounts of precipitate over a unit surface of rock.

It will be evident from the foregoing that the controlled and selective adjustment of permeability obtainable by the double decomposition reaction of ferrous sulfate and the silicate in the area and in the amount provides considerable improvement over presently available plugging methods. The double precipitate produced having two components of different characteristics provides considerable advantage over the single precipitate normally obtained in conventional treating methods. The precipitates in the present invention are highly hydrated giving them a gelatinous texture which is considerably firmer and has greater holding power than the single precipitate. Moreover, the weakly acidic solutions often encountered in the strata which dissolve either the ferrous or ferric hydroxide precipitate will not have the same effect on silica gel. Additionally, the double precipitate obtainable, according to the reaction utilized herein, provides a greater volume of plugging material per unit cost than can be obtained with the single type of plugging precipitate.

Other methods of applying the principle of our invention may be employed over those described herein. It is our intent that the scope of this invention be limited only by the claims appended herewith. What we claim is:

1. The method of selectively adjusting permeability of a formation to increase oil recovery therefrom which comprises introducing into the formation two aqueous solutions, said solutions being oil insoluble and capable of producing on mixing in the formation a double decomposition reaction so as to simultaneously produce a double permeability adjusting precipitate, said solutions being a metal sulfate solution and an alkali metal silicate solution, controlling the area and position of the double precipitate by separating said solutions during their introduction and passage through the formation by means of a spacing medium, the amount of said spacing medium being determined according to the equation of $V=2\pi rwhps$, wherein $r$=distance in feet from the well bore at which the reaction is to start; $w$=width in feet of spacer liquid band desired at distance $r$; $h$=thickness in feet of the zone being treated; $p$=porosity of the formation; and $s$=average water saturation up to the point where the reaction is to start.

2. The method of selectively adjusting permeability of a formation to increase oil recovery therefrom which comprises introducing an aqueous ferrous sulfate solution into the formation, introducing an aqueous metal silicate solution into the formation behind said sulfate solution, separating said solutions during their introduction by means of specific volume of spacing liquid, said specific volume of spacing liquid being determined according to the equation $V=2\pi rwhps$, wherein $r$=distance in feet from the well bore at which the reaction is to start; $w$=width in feet of spacer liquid band desired at distance $r$; $h$=thickness in feet of the zone being treated; $p$=porosity of the formation; and $s$=average water saturation up to the point where the reaction is to start.

3. The method of selectively adjusting permeability of a formation as claimed in claim 2, wherein the spacing liquid is substantially inert to both reactant solutions.

4. The method of selectively adjusting permeability of a formation as claimed in claim 2, wherein the spacing liquid is a naturally occurring brine.

5. The method of selectively adjusting permeability of a formation as claimed in claim 2, wherein the spacing liquid is water.

6. The method of selectively adjusting permeability of a formation as claimed in claim 2, wherein the spacing liquid is inert to the formation being treated.

7. The method of selectively adjusting permeability of a formation to obtain increased oil recovery therefrom which comprises injecting into the formation an aqueous solution of ferrous sulfate, following the sulfate solution with a measured quantity of spacing liquid, following the sulfate solution with an aqueous solution of an alkali metal silicate, said measured quantity of spacing liquid being used to control the area and position of precipitate formed in the formation and being determined according to the equation $V=2\pi rwhps$, wherein $r$=distance in feet from the well bore at which the reaction is to start; $w$=width in feet of spacer liquid band desired at distance $r$; $h$=thickness in feet of the zone being treated; $p$=porosity of the formation; and $s$=average water saturation up to the point where the reaction is to start.

8. The method of selectively adjusting permeability of a formation to obtain increased oil recovery therefrom as claimed in claim 7, wherein the alkali metal silicate is selected from the group comprising sodium silicate and potassium silicate.

9. The method of selectively adjusting permeability of a formation to increase oil recovery therefrom as claimed in claim 7, wherein the silicate solution is sodium silicate.

10. The method of selectively adjusting permeability of a formation to increase oil recovery therefrom as claimed in claim 7, wherein the silicate solution is potassium silicate.

11. The method of selectively adjusting permeability of a formation to increase oil recovery during a secondary recovery operation which comprises injecting into the formation an aqueous solution of ferrous sulfate, following said ferrous sulfate solution with a quantity of spacing liquid containing a pumpable amount of granular material, following said inert liquid with an aqueous solution of an alkali metal silicate, controlling the area and position of the precipitate formed in the formation by predetermining the volume of spacing liquid required according to the equation $V=2\pi rwhps$, wherein $r$=distance in feet from the well bore at which the reaction is to start; $w$=width in feet of spacer liquid band desired at distance $r$; $h$=thickness in feet of the zone being treated; $p$=porosity of the formation; and $s$=average water saturation up to the point where the reaction is to start.

12. The method of selectively adjusting permeability of a formation to obtain increased oil recovery therefrom as claimed in claim 11, wherein the granular material is sand.

13. The method of selectively adjusting permeability of a formation to obtain increased oil recovery therefrom as claimed in claim 11, wherein the granular material is hydratable clay.

14. The method of selectively adjusting permeability of a formation to obtain increased oil recovery therefrom as claimed in claim 11, wherein the granular material is powdered limestone.

References Cited in the file of this patent

UNITED STATES PATENTS

| | | |
|---|---|---|
| 2,001,350 | Mills | May 14, 1935 |
| 2,238,930 | Chamberlain et al. | Apr. 22, 1941 |
| 2,274,566 | Sullivan | Feb. 24, 1942 |
| 2,747,670 | King et al. | May 29, 1956 |

UNITED STATES PATENT OFFICE
Certificate of Correction

Patent No. 2,807,324 September 24, 1957

Jack A. King et al.

It is hereby certified that error appears in the printed specification of the above numbered patent requiring correction and that the said Letters Patent should read as corrected below.

Column 4, line 25, for "$1=2\pi rwhps$" read —$v=2\pi rwhps$—; column 5, line 32, for "70-40 mesh" read —70-140 mesh—.

Signed and sealed this 19th day of November 1957.

[SEAL]

Attest:
KARL H. AXLINE,
*Attesting Officer.*

ROBERT C. WATSON,
*Commissioner of Patents.*